United States Patent Office 3,186,928
Patented June 1, 1965

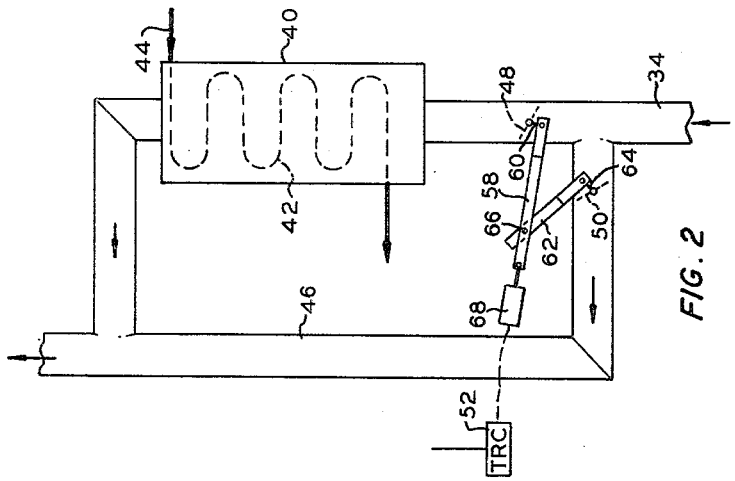
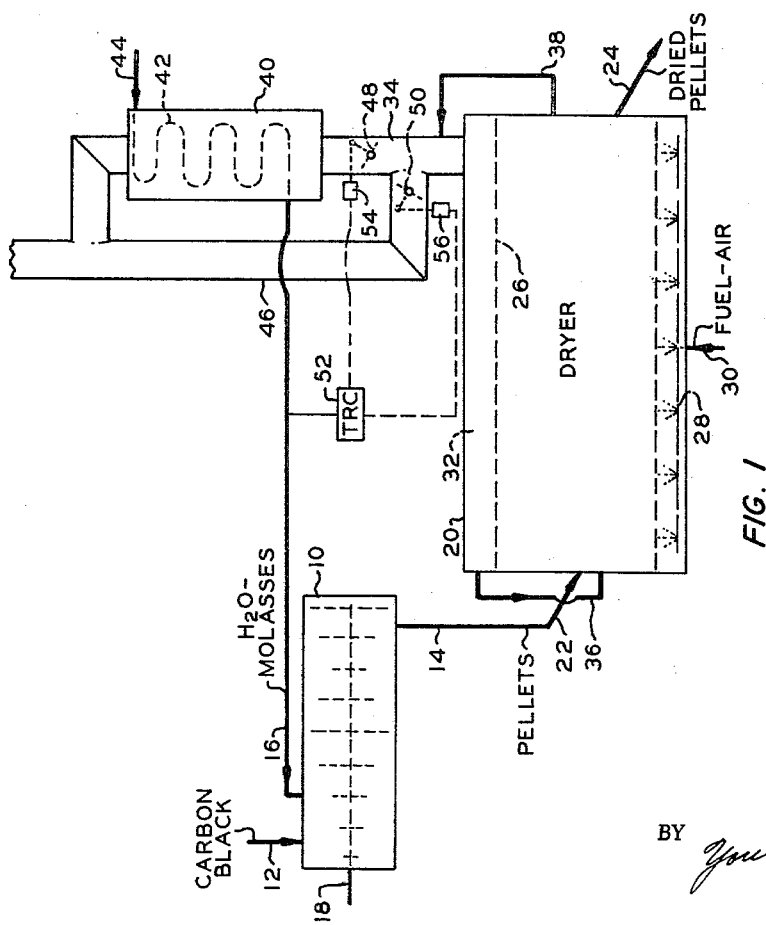

3,186,928
PROCESS FOR WET PELLETING OF
CARBON BLACK
Lawrence C. Keaton and William R. King, Borger, Tex.,
assignors to Phillips Petroleum Company, a corporation
of Delaware
Filed Aug. 8, 1962, Ser. No. 215,686
7 Claims. (Cl. 264—117)

This invention relates to a process for the wet pelleting of carbon black.

It is conventional to wet pellet dry flocculent carbon black into small pellets suitable for handling and commercial use whereby the problem of dust is substantially eliminated. In one type of commercial process the flocculent black is fed into a pelletizer and is there admixed with water in proper proportions for pelleting the black into relatively hard wet pellets as the mixture of black and water pass thru the pelletizer which is essentially a pug mill. It is common practice to incorporate in the water fed to the pelletizer a minor proportion of molasses which of course goes into solution in the water.

We have found that peak operation of the said pelleting mixers or pelletizers occurs when the temperature of the aqueous liquid is maintained at about 185° F. and improved operation results when the aqueous liquid temperature is in the range of about 150 to 210° F. This invention is concerned with a method and apparatus for providing a substantially constant elevated temperature in the aqueous liquid passing to the pelletizer.

Accordingly, a principal object of the invention is to provide an improvement in a process for wet pelleting flocculent carbon black. Another object is to provide an improved process for wet pelleting flocculent carbon black and drying the wet pellets. A further object is to conserve heat in the wet pelleting of carbon black and drying of the wet pellets. Another object of the invention is to provide a method for controlling the heating of the aqueous liquid being fed to a wet pelleting process. Other objects of the invention will become apparent to one skilled in the art upon consideration of the accompanying disclosure.

A broad aspect of the invention comprises heating the aqueous liquid being fed to a wet pelleting process so as to improve the pelleting of flocculent carbon black. The aqueous liquid is heated to a temperature in the range of 150 to 210° F. and preferably to about 185° F. The aqueous liquid, preferably containing a minor concentration of molasses, is heated by indirect heat exchange with the effluent hot gas from the dryer thru which the wet pellets are passed to dry same. In this manner the efficiency of the wet pelleting process is substantially increased without the extra expense of heating the pelleting liquid since only waste heat normally vented to the atmosphere is utilized.

The invention is best understood by reference to the accompanying drawing of which FIGURE 1 is a flow showing the arrangement of apparatus for effecting the invention and FIGURE 2 is an elevation of the heat exchange arrangement of FIGURE 1 with a second embodiment of the controls therefor.

Referring to FIGURE 1, a wet pelletizer 10 is provided with a carbon black feed inlet line 12, a wet pellet outlet line 14, an aqueous feed line 16, and axis 18 for rotation of the pelletizer. A hot gas dryer 20 receives wet pellets from line 14 by means of conduit 22 and is provided with an effluent dried pellet line 24, an internally rotating drum 26 and burner system 28 under drum 26 which is fed by fuel line 30. Hot gas surrounds drum 26, passing thru annulus 32 to stack 34. Internal circulation of hot gas thru drum 26 is effected by means of conduit 36 which takes gas from annulus 32 and introduces same to drum 26 and by means of conduit 38 which passes gas from the interior of drum 26 to stack 34.

Indirect heat exchanger 40 is positioned in stack 34 and is provided with heating coil 42 connected with aqueous feed line 44 at its inlet end and with aqueous liquid line 16 at its outlet end.

Conduit 46 connects with stack 34 below heat exchanger 40 and also with the stack above heat exchanger 40 so as to form a by-pass for hot gas around the heat exchanger. A valve 48 in stack 34 above the junction with stack 46 controls the flow of gas thru the heat exchanger in combination with valve 50 in by-pass conduit 46. These valves may be butterfly valves or any other suitable easily operable valve for varying the flow thru their respective conduits.

The control of the amount of heating is effected by a temperature recorder controller 52 which is sensitive to the temperature of the liquid in line 16 and operatively connected with motors 54 and 56 which operate valves 48 and 50, respectively. Thus valves 48 and 50 are actuatable by instrument 52 thru motors 54 and 56, respectively.

In operation, when instrument 52 senses a temperature below the set point temperature for the liquid in line 16, motor valve 54 is actuated so as to open further to let more gas pass thru the heat exchanger and motor valve 56 is operated to further close valve 50 and decrease the flow of gas to by-pass conduit 46. Motors 54 and 56 may be either air operated or electrically operated by means of solenoids.

FIGURE 2 shows an arrangement wherein valves 48 and 50 are connected to a common lever operator comprising arm 58, connected with the operating crank 60 of valve 48, and arm 62, connected with the operating crank 64 of 50, these two arms being pivoted at 66. Motor valve 68 is operatively connected to the end of arm 58 so that movement of the motor valve effects coordinated control of valves 48 and 50 by closing one and opening the other or vice versa.

The embodiment shown in FIGURE 2 accomplishes the same result as that of FIGURE 1 with a single motor valve. When temperature recorder controller 52 senses a need for increased heat motor 68 is operated to increase the opening of valve 48 and decrease the opening of valve 50 thereby increasing the heat input to heat exchanger 40 and bringing the temperature in line 16 up to the required level. When sensed temperature in line 16 is too high or above the set point temperature of instrument 52, the reverse movement of motor 68 and operating arms of valves 48 and 50 is effected.

Certain modifications of the invention will become apparent to those skilled in the art and the illustrative details disclosed are not to be construed as imposing unnecessary limitations on the invention.

We claim:

1. A process for wet pelleting flocculent carbon black which comprises the steps of:
   (1) introducing said black into a wet pelletizer;
   (2) heating an aqueous pelleting liquid to a temperature in the range of about 150 to 210° F.;
   (3) introducing the heated aqueous liquid of step (2) into the pelletizer of step (1) so as to form wet pellets; and
   (4) recovering the resulting pellets.

2. The process of claim 1 wherein said liquid contains in solution therein a minor proportion of a carbonizable binder.

3. The process of claim 2 wherein said binder is molasses.

4. The process of claim 3 wherein said temperature is about 185° F.

5. A process for producing dried carbon black pellets from fluocculent carbon black which comprises introducing said black and an aqueous pelleting liquid at a temperature in the range of 150 to 210° F. into a pelletizer in proportions to form wet pellets in passing thru said pelletizer; passing the resulting wet pellets thru a dryer heated by hot gas so as to substantially dry same; passing hot off-gas from said dryer thru an indirect heat exchanger in indirect heat exchange with said aqueous liquid so as to heat same to a temperature in said range before passing same to said pelletizer at said temperature; and recovering the dried pellets.

6. The process of claim 5 wherein said temperature is about 185° F. and said liquid is a water solution of molasses.

7. The process of claim 5 wherein a portion of the off-gas from said dryer is passed thru said heat exchanger and said portion is regulated by sensing the temperature of the effluent aqueous liquid from said heat exchanger and controlling said portion in response to the sensed temperature to maintain said temperature substantially constant.

References Cited by the Examiner

UNITED STATES PATENTS

| | | | |
|---|---|---|---|
| 2,511,901 | 6/50 | Bunn | 264—117 |
| 2,527,595 | 11/50 | Swallen et al. | 264—29 |
| 2,803,038 | 8/57 | Holland et al. | 18—1 |
| 2,867,843 | 1/59 | Browne et al. | 18—1 |
| 2,942,299 | 6/60 | Larson | 264—117 |
| 2,962,763 | 12/60 | Brasch | 264—117 |
| 3,022,146 | 2/62 | Hullen | 44—13 |
| 3,071,803 | 1/63 | Austin | 264—117 |
| 3,092,489 | 6/63 | Smith | 264—117 XR |

FOREIGN PATENTS 643,398  9/50  Great Britain.

ROBERT F. WHITE, *Primary Examiner.*

ALEXANDER H. BRODMERKEL, *Examiner.*